(12) United States Patent
Wakiya (10) Patent No.: US 9,993,073 B2
(45) Date of Patent: Jun. 12, 2018

(54) READY-TO-ASSEMBLE FURNITURE

(71) Applicant: EMOTIONS CO., LTD., Chofu-shi, Tokyo (JP)

(72) Inventor: Masanori Wakiya, Tokyo (JP)

(73) Assignee: EMOTIONS CO., LTD., Chofu-shi, Tokyo (JP)

( * ) Notice: Subject to any disclaimer, the term of this patent is extended or adjusted under 35 U.S.C. 154(b) by 0 days. days.

(21) Appl. No.: 15/026,326

(22) PCT Filed: Sep. 16, 2014

(86) PCT No.: PCT/JP2014/074375
§ 371 (c)(1),
(2) Date: Mar. 31, 2016

(87) PCT Pub. No.: WO2015/049976
PCT Pub. Date: Apr. 9, 2015

(65) Prior Publication Data
US 2016/0242540 A1 Aug. 25, 2016

(30) Foreign Application Priority Data
Oct. 2, 2013 (JP) ................................. 2013-207041

(51) Int. Cl.
*A47B 47/00* (2006.01)
*A47B 43/00* (2006.01)
(Continued)

(52) U.S. Cl.
CPC .......... *A47B 47/0066* (2013.01); *A47B 43/00* (2013.01); *A47B 47/04* (2013.01);
(Continued)

(58) Field of Classification Search
CPC ... A47B 47/04; A47B 47/0066; A47B 47/007; A47B 43/00; F16B 5/008; F16B 5/0096; F16B 12/00; F16B 12/46; E04B 1/2608
(Continued)

(56) References Cited

U.S. PATENT DOCUMENTS

| 242,355 | A | * | 5/1881 | Nicholas | ................... | B65D 9/18 |
| | | | | | | 217/16 |
| 419,375 | A | * | 1/1890 | Starr | ....................... | E04B 1/49 |
| | | | | | | 411/464 |

(Continued)

FOREIGN PATENT DOCUMENTS

| JP | H09191955 A | 7/1997 |
| JP | 2008119212 A | 5/2008 |
| JP | 2013138748 A | 7/2013 |

OTHER PUBLICATIONS

ISA Japanese Patent Office, International Search Report Issued in Application No. PCT/JP2014/074375, dated Dec. 16, 2014, WIPO, 2 pages.

*Primary Examiner* — Patrick D Hawn
(74) *Attorney, Agent, or Firm* — Alleman Hall Creasman & Tuttle LLP (57) ABSTRACT

The purpose of the present invention is to provide a ready-to-assemble furniture that can be easily assembled by a user and that can be inexpensively manufactured. The ready-to-assemble furniture, in which a suitable number of wall surface component members that are adjacent with a prescribed included angle are coupled, is configured so that a coupling metal piece having a toughness couples the wall surface component members which are transitioned, by way of lifting operations by an assembler, from a pre-assembled state, which is one wall surface component member stacked on another, or which is a deployed position, to an assembled state having a prescribed included angle, wherein the cou- (Continued)

pling metal piece maintains the relative position of the wall surface component members by plastically deforming by way of bending stress generated in the coupling metal piece due to the lifting operations.

10 Claims, 7 Drawing Sheets

(51) Int. Cl.
  *A47B 47/04* (2006.01)
  *F16B 12/46* (2006.01)
  *F16B 5/00* (2006.01)
  *F16B 12/00* (2006.01)

(52) U.S. Cl.
  CPC ............ *F16B 5/008* (2013.01); *F16B 5/0096* (2013.01); *F16B 12/00* (2013.01); *F16B 12/46* (2013.01)

(58) Field of Classification Search
  USPC ......... 312/258, 257.1, 262; 411/478; 52/255
  See application file for complete search history.

(56) References Cited

U.S. PATENT DOCUMENTS

| | | | | |
|---|---|---|---|---|
| 1,019,951 | A * | 3/1912 | Congill | E04B 5/40 52/250 |
| 1,030,044 | A * | 6/1912 | Wittbecker | E04F 13/06 52/255 |
| 1,128,031 | A * | 2/1915 | Needleman | A63H 3/52 232/24 |
| 1,320,303 | A * | 10/1919 | Young | F16B 15/00 411/465 |
| 1,724,288 | A * | 8/1929 | La Brecque | A47G 27/0456 16/4 |
| 2,396,030 | A * | 3/1946 | Terry | F16B 15/0046 285/257 |
| 3,398,981 | A * | 8/1968 | Vincens | A47B 17/003 108/158.11 |
| 3,583,781 | A * | 6/1971 | Yamawaki | A47B 3/00 312/258 |
| 3,644,011 | A * | 2/1972 | MacDonald | A47B 43/00 312/258 |
| 3,784,273 | A * | 1/1974 | Nikolai | A47B 47/0075 16/382 |
| 3,812,977 | A * | 5/1974 | Glassman | A47B 47/0075 108/60 |
| 3,828,514 | A * | 8/1974 | Jureit | E04B 1/2608 403/230 |
| 4,325,597 | A * | 4/1982 | Morrison | A47B 47/04 108/61 |
| 4,763,455 | A * | 8/1988 | Schneller | E04F 13/06 52/255 |
| 4,805,592 | A * | 2/1989 | Enami | B21D 39/03 126/273 R |
| 4,876,837 | A * | 10/1989 | Kelly | B21B 1/082 52/254 |
| 5,138,810 | A * | 8/1992 | Kartler | E04F 13/06 52/254 |
| 5,410,854 | A * | 5/1995 | Kimmell | E04B 1/2608 411/465 |
| 5,882,098 | A * | 3/1999 | Brown | A47B 3/08 108/179 |
| 5,934,034 | A * | 8/1999 | Yahiro | E04F 13/06 52/255 |
| 6,722,750 | B2 * | 4/2004 | Chan | A47B 43/00 312/257.1 |
| 6,732,659 | B2 * | 5/2004 | Poon | A47B 47/0075 108/42 |
| 6,880,297 | B2 * | 4/2005 | Johnston | A47B 47/0075 16/225 |
| 7,065,932 | B2 * | 6/2006 | Roesset | E04B 1/2608 403/231 |
| 7,559,614 | B2 * | 7/2009 | Zheng | A47B 47/0075 312/238 |
| 7,788,865 | B2 * | 9/2010 | Koenig, Jr. | E04F 13/06 52/255 |
| 8,042,890 | B2 * | 10/2011 | Collins | A47B 47/0075 312/257.1 |
| 8,100,619 | B2 * | 1/2012 | Curtis | E04B 1/49 411/462 |
| 8,864,407 | B1 * | 10/2014 | Sorum | F16B 5/008 211/187 |
| 9,226,573 | B2 * | 1/2016 | Glenn, II | A47B 13/00 |
| 9,596,933 | B2 * | 3/2017 | Bader | A47B 96/00 |
| 2003/0085640 | A1 * | 5/2003 | Chan | A47B 43/00 312/262 |
| 2007/0007867 | A1 * | 1/2007 | Zheng | A47B 47/0075 312/238 |
| 2008/0012455 | A1 * | 1/2008 | Zheng | A47B 43/00 312/262 |
| 2008/0265728 | A1 * | 10/2008 | Collins | A47B 47/0075 312/326 |
| 2010/0260579 | A1 * | 10/2010 | Curtis | E04B 1/49 411/442 |
| 2013/0327256 | A1 * | 12/2013 | Glenn, II | A47B 13/00 108/50.02 |
| 2016/0174704 | A1 * | 6/2016 | Boo | A47B 47/0075 312/265.5 |

* cited by examiner

READY-TO-ASSEMBLE FURNITURE

TECHNICAL FIELD

The present invention relates to ready-to-assemble furniture.

BACKGROUND ART

Ready-to-assemble furniture formed by coupling wall surface component members to one another by predetermined coupling devices as described in Patent Document 1 is known. In this conventional example, the furniture is formed by coupling four panel plates (wall surface component members) by using coupling parts made of synthetic resin. Each of the coupling parts includes two blades and is formed to have an L-shaped cross section. The coupling parts are coupled to the wall surface component members by inserting the blades into engaging holes opened in the wall surface component members. When the blades are in an inserted state, an elastically deformable tongue-shaped portion formed in each blade is resiliently locked by an engaging recessed portion in the corresponding engaging hole to restrict the detachment of the blade from side surface-constituting parts. The coupling of the wall surface component members to one another, i.e., the assembling of the ready-to-assemble furniture, can be carried out just by mounting the blades of the coupling parts on the wall surface component members.

PRIOR ART DOCUMENT

Patent Document

Patent Document 1: Japanese Patent Application Publication No. 2008-119212

SUMMARY OF THE INVENTION

Problems to be Solved by the Invention

However, the above-described conventional example has such a problem that when the wall surface component members have relatively large heights and relatively large widths, a skill is required for an operation for mounting a coupling part on two wall surface component members to be coupled, while maintaining the two wall surface component members at a coupling angle, so that the assembly is complicated, and an assistant is necessary.

In addition, there is another problem in that an operation for opening the engaging holes in the wall surface component members increases the man-hours for the manufacture, and, especially, the formation of the engaging recessed portions which are undercut with respect to the direction of the opening operation requires many man-hours, which increases the manufacturing costs.

The present invention has been made to solve the above-described problems, and an object of the present invention is to provide ready-to-assemble furniture that can be easily assembled by a user and that can be inexpensively manufactured.

Means for Solving the Problem

According to the present invention, the above-described object can be achieved by providing ready-to-assemble furniture, in which a suitable number of wall surface component members 1 that are adjacent to one another are coupled to one another with prescribed included angles, the ready-to-assemble furniture comprising:

at least one metal piece coupling portion 3 in which a pair of the wall surface component members 1, 1 are coupled to each other by a coupling metal piece 2 having toughness, and which enables a transition from a pre-assembled state where one of the wall surface component members 1 takes a stacked or deployed position with respect to the other to an assembled state where the wall surface component members 1, 1 are set with a prescribed included angle by a lifting operation by an assembler, wherein the coupling metal piece 2 is plastically deformed by a bending stress generated in the coupling metal piece 2 with the lifting operation and maintains a relative position of the wall surface component members 1, 1.

In the ready-to-assemble furniture in the assembled state, multiple wall surface component members 1, 1, . . . are coupled to one another with prescribed included angles to form a housing space inside the ready-to-assemble furniture. Here, all of or some of coupling portions between the wall surface component members 1, 1 include the coupling metal pieces 2. Each of the wall surface component member 1 may have a panel-like shape or a frame shape, and the ready-to-assemble furniture may surround the housing space like a frame, or may surround all the sides of the housing space. Moreover, for the housing space, not only a generally employed cuboid shape, but also various polygonal shapes can be employed.

The metal piece coupling portion 3 is formed by coupling both ends of the coupling metal piece 2 having toughness to the wall surface component members 1, 1 by using threaded nails or the like. In the pre-assembled state, the wall surface component members 1, 1 coupled to each other by the metal piece coupling portion 3 takes a deployed state where the wall surface component members 1, 1 are positioned on substantially the same plane or a folded state where the wall surface component members 1, 1 are stacked on each other. This enables space-saving at transportation or storage.

The ready-to-assemble furniture is assembled as follows. Specifically, one of the two wall surface component members 1, 1 coupled by the metal piece coupling portion 3 is lifted from the other. Then, if any other wall surface component member 1 is set by coupling means other than the metal piece coupling portion 3, the other wall surface component member 1 is coupled.

By the lifting operation of the wall surface component member 1 in the metal piece coupling portion 3, a bending stress generated in the coupling metal piece 2 is generated in the metal piece coupling portion 3. The wall surface component member 1, which constitutes a side plate, a top plate, a bottom plate, or the like, of the ready-to-assemble furniture has a suitable size, and an arm length from the metal piece coupling portion 3 is considerably long. Hence, only by conducting an operation for lifting the wall surface component member 1, a large bending moment is generated in the metal piece coupling portion 3, and a sufficient bending stress can be generated in the coupling metal piece 2.

However, since the coupling metal piece 2 is made of a tough material which is not broken even beyond the elastic limit, but which can plastically deform as appropriate, the coupling metal piece 2 is bent with a prescribed angle by the applied moment, without breakage.

Accordingly, the metal piece coupling portion 3 in the present invention can be formed only by fixing the flat plate-shaped coupling metal piece 2 to the wall surface component members 1 by suitable fixing means such as threaded nails. The use of the flat plate-shaped coupling metal piece 2 instead of a hinge member such as a hinge makes it possible to reduce the component costs. Moreover, since it is not necessary to perform a special process on the wall surface component members 1 for forming coupling portions as in the above-described conventional example, the manufacturing costs can be reduced.

In addition, the operation for the transition between the pre-assembled state and the assembled state of the wall surface component members 1 coupled to each other by the flat plate-shaped coupling metal piece 2 can be completed by simply moving the wall surface component members 1 in predetermined directions. For this reason, the workability is improved. Especially, the transition to the assembled state can be completed only by moving the wall surface component members 1 to predetermined positions, without requiring an operation for fixing the coupling metal piece 2 to the wall surface component members 1. Hence, even a user not accustomed to an assembling operation can conduct the assembling operation easily. In addition, when a hinge or the like is used in the coupling portion, there is a need for an operation for preventing the wall surface component members 1 from turning back to an initial stage position, after the wall surface component members 1 are moved to the predetermined positions. In contrast, since the coupling metal piece 2 is deformed to have a prescribed angle only by moving the wall surface component members 1 to the predetermined positions, the use of the coupling metal piece 2 eliminates the need for an operation for maintaining the wall surface component members 1 at the positions and the like. For this reason, the workability of the assembling is improved very much.

Further, the coupling metal piece 2 can be configured such that a plastic deformation line 4 of the coupling metal piece 2 is set by providing rigidity to a center portion along a narrow-width region having open ends on both sides.

By proving the rigidity along the narrow-width region, the resultant narrow-width region has a lower rigidity than the other region, and forms a plastic deformation line 4 along which the coupling metal piece 2 can be easily bent. By limiting the plastic deformation region to the narrow-width region, the curvature at the bending portion is reduced, and the corner portion can be fitted well. Moreover, since the position at which the wall surface component members 1, 1 are bent is limited, the position of an opposite end is accurately determined with respect to the center of the bending of each of the wall surface component members 1. Hence, the shape after the assembling is stabilized.

The above-described plastic deformation line 4 can be formed by arranging coupling portions 5, in which the coupling metal piece 2 is coupled to the wall surface component members 1, close to each other, and utilizing a resulting improvement in the rigidity of the coupling portions 5.

Alternatively, layered and stacked portions 6 are formed in the coupling metal piece 2 except for the center portion by folding back opposite side edges of the coupling metal piece 2, and a non-layered and non-stacked portion 7 can be employed as the plastic deformation line 4.

Moreover, the plastic deformation line 4 can also be formed by providing a bellows-shaped zigzag portion 8 in the center portion of the coupling metal piece 2.

In addition, when the metal piece coupling portion 3 is configured such that the included angle between the wall surface component members 1, 1 in the assembled state are determined with a member end 9 of one of the wall surface component members 1 abutting on a side wall 10 of the other one of the wall surface component members 1. In this case, the abutting portion functions as positioning means, and also functions as a rigid connection portion described later. Hence, the included angle between the wall surface component members 1, 1 is surely determined, and the strength increases.

As described above, the ready-to-assemble furniture enables the transition from the pre-assembled state, where the wall surface component members 1 coupled by the metal piece coupling portion 3 take a deployed or folded state, to the assembled state. Here, suppose a case where the wall surface component members 1, 1 are coupled to each other in a direct and rigid connection state, or the wall surface component members 1, 1 are coupled to each other by an additional member in a direct and rigid connection state to achieve a stable structure in the assembled state even when the metal piece coupling portion 3 is connected by a pin. In this case, the generation of the bending moment on the metal piece coupling portion 3 can be restricted, so that the deformation resistance of the ready-to-assemble furniture can be improved.

For example, in a case of ready-to-assemble furniture having a rectangular frame shape with four sidewalls, the direct coupling between the wall surface component members 1, 1 can be achieved by converting the four sidewalls coupled to each other by the coupling metal pieces 2 to the assembled state in advance, and then coupling the adjacent wall surface component members 1, 1 by an L-shaped coupling device whose rigidity is increased by providing a rib or the like at a bent portion. The coupling operation by using the L-shaped coupling device can be achieved by fixing the coupling device with a threaded nail, or by mounting the coupling device directly on the wall surface component members 1 or by fitting the coupling device in a fitting portion provided by fixing a suitable meal device. The coupling portion by the L-shaped coupling device forms a rigid connection portion, and can improve the strength of the entirety.

Meanwhile, the coupling through an additional member can be achieved by setting a suitable member dedicated to the coupling between the wall surface component members 1, or can be achieved by using a wall surface component member 1 to constitute a wall at the completion of the assembling. In this case, the ready-to-assemble furniture include a frame component portion 11 formed by coupling with the metal piece coupling portions 3 to constitute a part of a frame shape, and a coupling wall surface component member 12 which couples both free-edge portions of the frame component portion 11 to each other to complete the frame shape.

According to the present invention, the ready-to-assemble furniture can be completed only by lifting up the wall surface component member 1 to convert the frame component portion 11 to the assembled state, and then coupling the coupling wall surface component member 12 to the open ends. In other words, the ready-to-assemble furniture can be completed only by lifting up the already coupled wall surface component member 1, and coupling the coupling wall surface component member 12, by suitable means, to the frame component portion 11, which are maintained in the lifted state without requiring any support because of the action of the coupling metal piece 2. For this reason, even a user not accustomed to an assembling operation can easily conduct the assembling operation.

In this case, the coupling wall surface component member 12 and each of the free-edge portions of the frame component portion 11 can be coupled to each other by fitting a slide coupling device 13 having a dogleg-shaped cross section and being fixed to one of the coupling wall surface component member 12 and the free-edge portion of the frame component portion 11 into a fitting groove 14 formed in the other.

The slide coupling device 13 includes a fixed piece fixed in advance to the one of the wall surface component member 1 and the coupling wall surface component member 12 by using a threaded nail or the like and a fitting piece to be fitted in the fitting groove 14 formed in the other, and is formed to have a dogleg-shaped cross section.

Accordingly, in the present invention, the assembling operation can be completed only by lifting up the wall surface component members 1 to predetermined positions to transform the frame component portion 11 into a predetermined shape, then fitting the fitting pieces of the slide coupling devices 13 into the fitting grooves 14, and sliding the coupling wall surface component members 12. Each of the fitting pieces extends obliquely in the thickness direction of the coupling wall surface component member 12. Hence, when the edges of the coupling wall surface component members 12 on both sides in the width direction are coupled to the frame component portion 11 by the slide coupling devices 13 with the fitting pieces being fitted in the fitting grooves 14, the movement in the width direction is also completely restricted, in addition to the movement to the front and back sides. Accordingly, detachment from the frame component portion 11 is completely prevented.

Further in this case, the ready-to-assemble furniture may be configured such that the slide coupling device 13 is fixed to the coupling wall surface component member 12, with a fitting piece 17 protruding from an inner wall 15 side to an outer wall 16 side of the coupling wall surface component member 12 in an inclined manner from a member end of the coupling wall surface component member 12 abutting on the frame component portion 11, and a stopper 18 for restricting movement of the coupling wall surface component member 12 to the inner wall 15 side is formed on a free-edge portion of the frame component portion 11.

The fitting workability of the slide coupling device 13 can be improved by making the thickness of the fitting piece 17 of the slide coupling device 13 slightly smaller than the width of the fitting groove 14. However, if a space exists between the fitting piece 17 and the fitting groove 14, the coupling wall surface component member 12 rattles. When a force is wrongly applied in the direction to deform the coupling metal piece 2, the fitting may be separated. In this respect, the stopper 18 for restricting the movement of the coupling wall surface component member 12 to the inner wall 15 side is provided adjacent to and inside the fitting groove 14 in a protruding manner to restrict the inward movement of coupling wall surface component member 12 caused by the movement of the inclined fitting piece 17 in the direction to be pulled out from the fitting groove 14, so that unexpected separation of the fitting can be prevented.

In addition, the ready-to-assemble furniture can be configured such that a frame component portion 11 having a rectangular frame shape is provided in which the wall surface component members 1, 1 are coupled together by the metal piece coupling portions 3 and whose assembled state is maintained with member ends 9 of a pair of the wall surface component members 1, 1 facing each other abutting on end-portion side walls 10 of adjacent ones of the wall surface component members 1, the coupling metal pieces 2 are movably coupled to abutting ones of the wall surface component members 1 in a longitudinal direction, and the frame component portion 11 is transformable to the pre-assembled state by canceling the abutting state by sliding receiving ones of the wall surface component members 1 in the assembled state, and then collapsing the rectangular frame shape.

In the present invention, the frame component portion 11 is formed by coupling four wall surface component members 1 together by the metal piece coupling portions 3, and is assembled as follows. Specifically, the frame component portion 11 is transformed from the folded pre-assembled state to the rectangular frame shape by lifting one of the wall surface component members 1. Then, the pair of wall surface component members 1, 1 facing each other are slid so that end surfaces of the pair of wall surface component members 1, 1 can come into contact with the side walls 10 of the adjacent ones of the wall surface component members 1.

Hence, according to the present invention, the assembling operation can be completed without any special coupling operation, and the workability of the assembling can be further improved.

Effect of the Invention

According to the present invention, even a user not accustomed to handling tools or the like can easily conduct the assembling operation, and the manufacturing costs can be reduced.

BRIEF DESCRIPTION OF THE DRAWINGS

FIGS. 1A and 1B show perspective views illustrating ready-to-assemble furniture according to the present invention, where

FIGS. 2A-2C show views illustrating an initial stage of assembling, where

FIGS. 3A and 3B show views illustrating a final stage of the assembling, where

FIGS. 4A and 4B show views illustrating a coupling structure between the coupling wall surface component member and the frame component portion, where

FIGS. 5A and 5B show views of modifications of metal piece coupling portions corresponding to FIG. 2B, where

FIGS. 6A and 6B show views illustrating another embodiment, where

FIGS. 7A-7C show views illustrating a coupling structure between wall surface component members, where

MODE FOR CARRYING OUT THE INVENTION

Figure 1A:
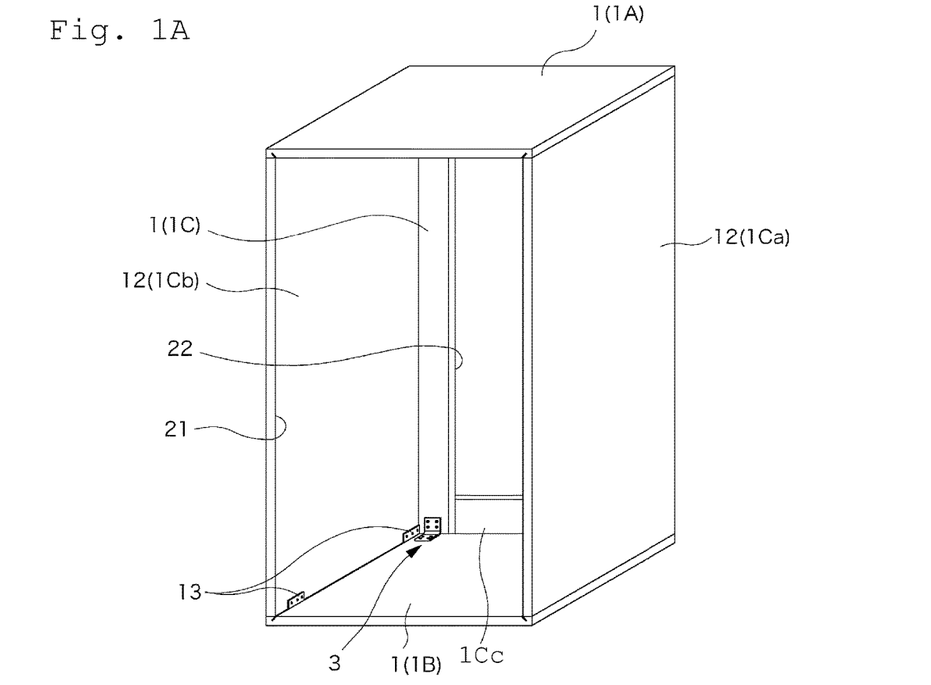
FIG. 1A is a perspective view illustrating an assembled state.

FIGS. 1A to 4B show an embodiment of the present invention. This embodiment shows a ready-to-assemble audiovisual (AV) rack. As shown in FIG. 1A, the AV rack is formed in a box-like shape by coupling wall surface component members 1 to one another, including a top plate 1A, a bottom plate 1B, and side members 1C, each of which is formed of a material having a suitable strength such as wood. Inside the AV rack, a housing portion 21 is provided in which audiovisual equipment is housed. The side members 1C include a right-side plate 1Ca (coupling wall surface component member 12) and a left-side plate 1Cb (coupling wall surface component member 12) respectively positioned on the right and the left in a front view and a back member 1Cc positioned on a back side in the front view. In the back member 1Cc, an opening portion 22 is formed through which connection cables of the audiovisual equipment are led to the outside. This back member 1Cc is formed by mounting strip-shaped vertical members 23 and strip-shaped horizontal members 24 in a quadrangular frame shape.

Figure 1B:
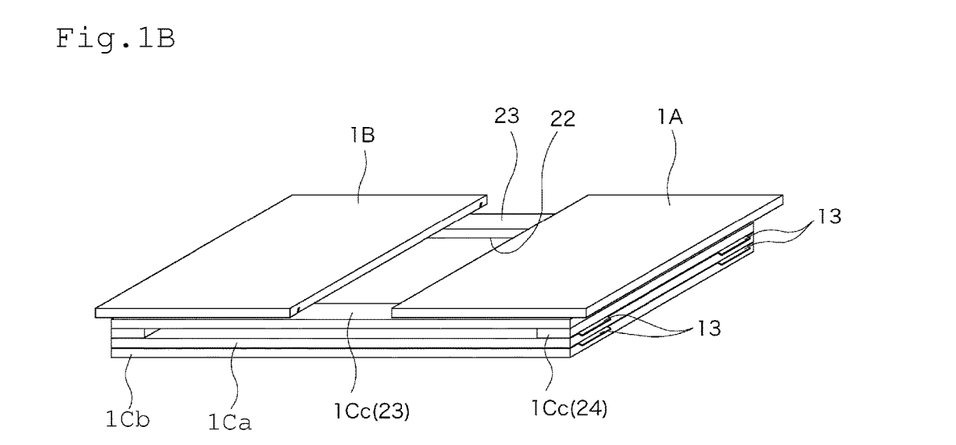
FIG. 1B is a perspective view illustrating a pre-assembled state.

The above-described AV rack can be assembled from a pre-assembled state shown in FIG. 1B to an assembled state shown in FIG. 1A. In the pre-assembled state, the AV rack as a whole takes a substantially plate-like shape. To easily achieve such assembling, the above-described back member 1Cc is coupled to the top plate 1A and the bottom plate 1B by means of metal piece coupling portions 3. Each of the metal piece coupling portions 3 includes a coupling metal piece 2 made of a metal piece having a high toughness such as a cold rolled steel sheet. The metal piece coupling portions 3 are formed by attaching the coupling metal piece 2 to a corresponding one of upper and lower edge portions of the back member 1Cc and to a rear edge portion of a corresponding one of the top plate 1A and the bottom plate 1B in a straddling manner. The coupling metal piece 2 includes layered and stacked portions 6 obtained by folding back edges on opposite sides of a metal piece formed into a strip shape and having a thickness of about 1 mm and thus layering the metal piece in edge portions on the both sides to increase the rigidity. In a center portion, a belt-shaped non-layered and non-stacked portion 7 is formed which has a relatively low rigidity because the metal piece is not layered.

Figures 2A, 2B:
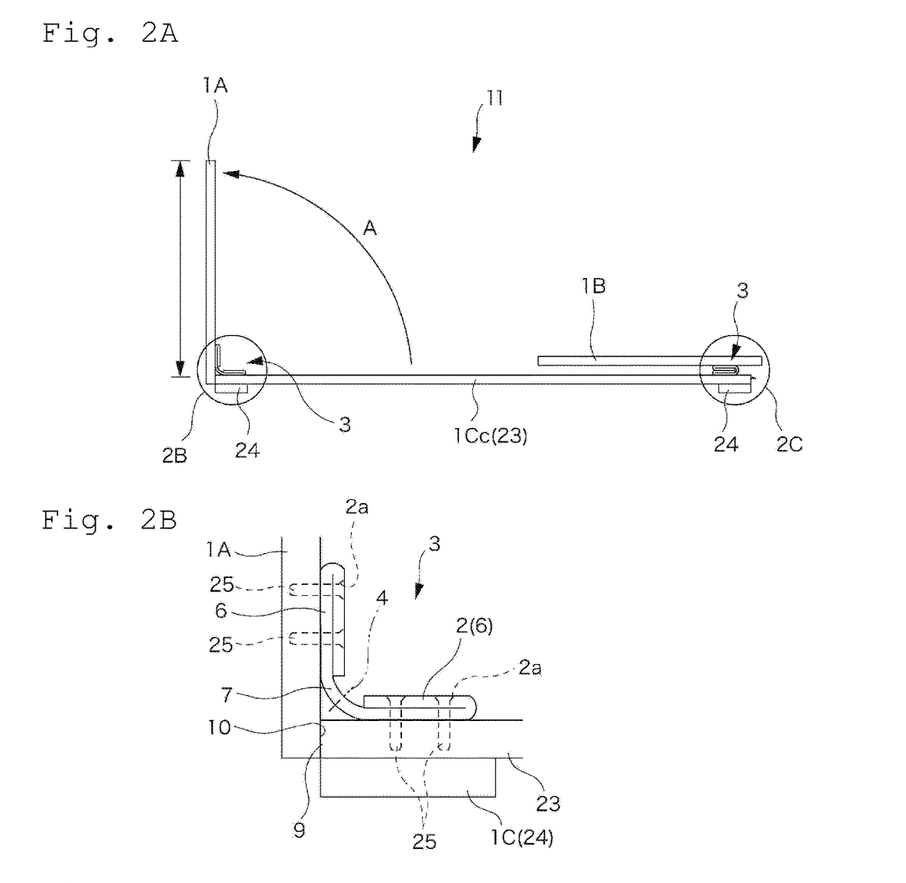
FIG. 2A is a side view illustrating a state where a wall surface component member which functions as a top plate is subjected to a lifting operation.
FIG. 2B is an enlarged view of a portion 2B of FIG. 2A.
Figure 2C:
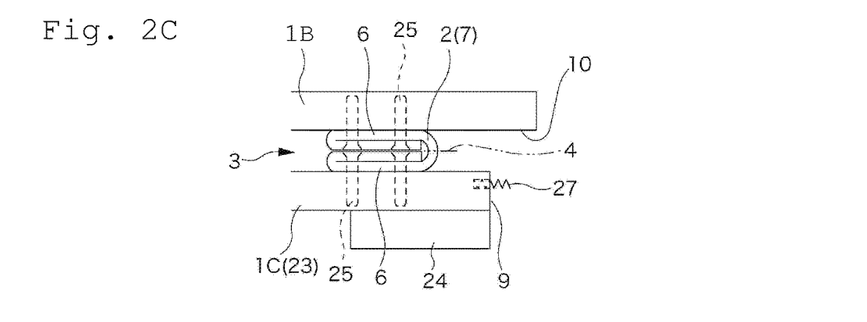
FIG. 2C is an enlarged view of a portion 2C of FIG. 2A.
Figure 3A:
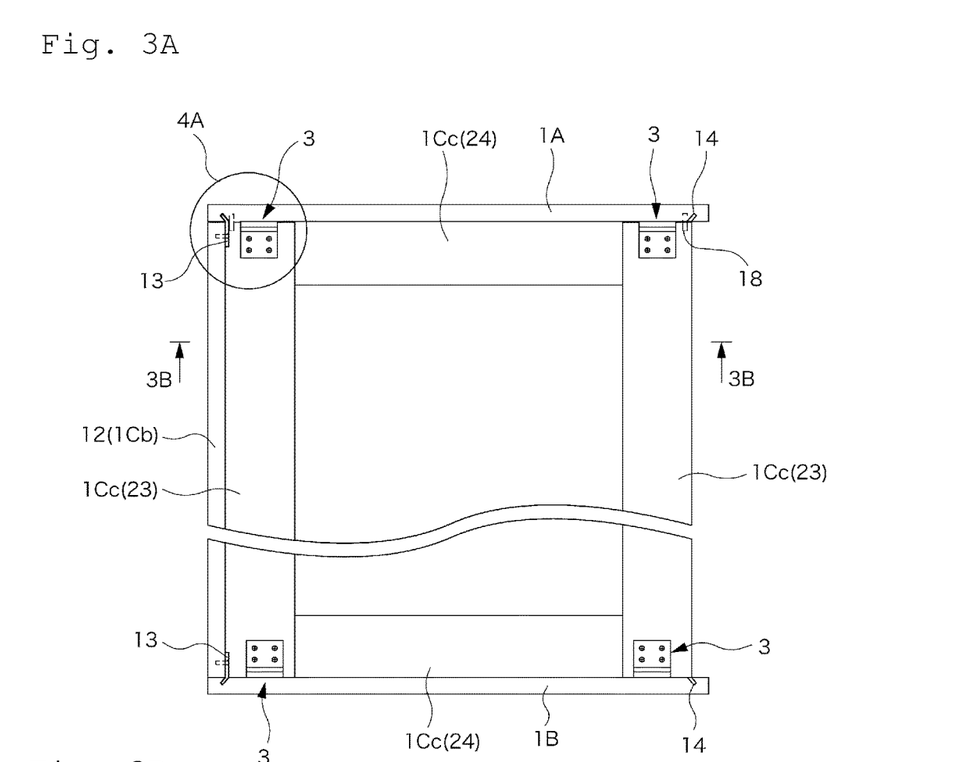
FIG. 3A is a front view illustrating a state where a coupling wall surface component member is mounted on a frame component portion.
Figure 3B:
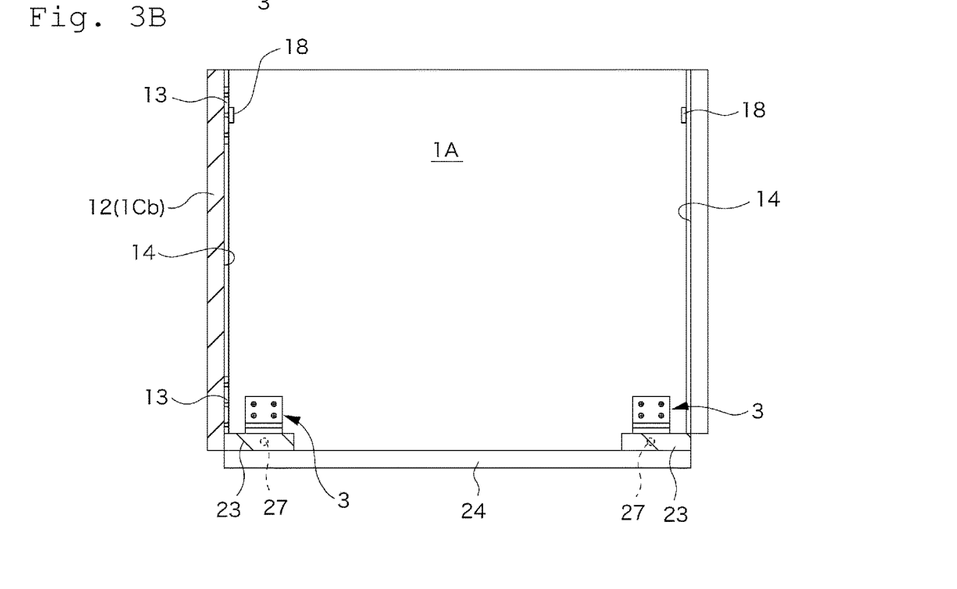
FIG. 3B is a cross-sectional view taken along the line 3B-3B of FIG. 3A.

As shown in FIGS. 2B and 2C, the layered and stacked portions 6 of the coupling metal piece 2 described above are fixed to the back member 1Cc and to the top plate 1A or the like with screws 25. In this state, the non-layered and non-stacked portion 7 is positioned at a boundary between the back member 1Cc and the top plate 1A or the like. In addition, the top plate 1A and the like are coupled to the vertical members 23 by using the coupling metal pieces 2, with rear edges of the top plate 1A and the like being mated with a back surface of the back member 1Cc, more precisely, back surfaces of the vertical members 23. Note that each of the coupling metal pieces 2 is provided with counterbores 2a for preventing head portions of the above-described screws 25 from protruding from the surface.

Accordingly, for example, when the coupling metal piece 2 is folded back at the non-layered and non-stacked portion 7, as shown in FIGS. 2A-2C, the entirety can be folded up into a thin plate-like shape by stacking the top plate 1A and the like on the surface of the back member 1Cc. In addition, when a front edge portion of the top plate 1A or the like in this folded state is lifted up from the back member 1Cc as indicated by the arrow A in FIG. 2A by holding the front edge portion with the hand, the coupling metal piece 2 can be plastically deformed easily by utilizing an arm length L extending from a front edge of the top plate 1A or the like to the non-layered and non-stacked portion 7, i.e., the length of the top plate 1A or the like. This enables the top plate 1A or the like to take an orthogonal state with respect to the back member 1Cc. For the transformation to the orthogonal state, the top plate 1A or the like may be lifted up until a surface of an inner wall 15 comes into contact with a member end 9 of the back member 1Cc. Here, a bending stress is concentrated on a linear region (the plastic deformation line 4) at a center of the non-layered and non-stacked portion 7, and the coupling metal piece 2 plastically deforms. In addition, after the lifting, the orthogonal state can be maintained suitably by the rigidity of the coupling metal piece 2 and the abutment of an inner wall surface (a side wall 10) of the top plate 1A or the like on the member end 9 of the back member Cc.

By the lifting operation as described above, the back member 1Cc, the top plate 1A, and the bottom plate 1B, which can be transformed from the substantially plate-like shape shown in FIG. 1B into a U shape in a side view, function as a frame component portion 11 constituting a part of a frame shape described later. The above-described frame shape is completed by mounting the right-side plate 1Ca and the left-side plate 1Cb on the top plate 1A and the bottom plate 1B. The AV rack forms a box-like shape by covering, with the back member 1Cc, one of openings of the frame shape formed by attaching the right-side plate 1Ca and the left-side plate 1Cb between the top plate 1A and the bottom plate 1B.

Figure 4A:
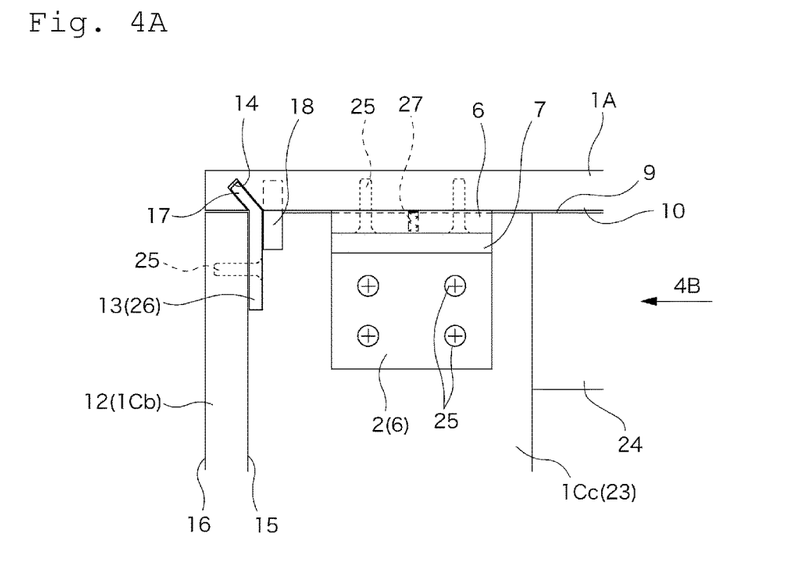
FIG. 4A is an enlarged view of a portion 4A of FIG. 3A.
Figure 4B:
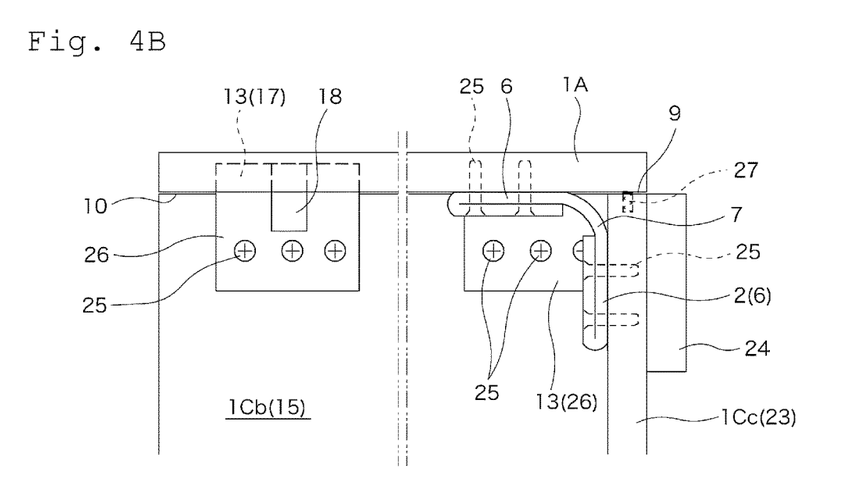
FIG. 4B is a view taken in the direction of the arrow 4B in FIG. 4A.

To provide the right-side plate 1Ca and the left-side plate 1Cb between both free-edge portions of the frame component portion 11 as described above, more precisely, between side edge portions of the top plate 1A and the bottom plate 1B, slide coupling devices 13 are attached to upper and lower edge portions of the left-side plate 1Cb and the like, and fitting grooves 14 in which the slide coupling devices 13 are to be fitted are formed in side edge portions of the top plate 1A and the like, as shown in FIGS. 3A to 4B. Each of the slide coupling devices 13 is made of a material having a high strength such as a metal. As shown in FIGS. 4A and 4B, the slide coupling device 13 is formed to have a dogleg-shaped cross section by providing a fitting piece 17 so as to extend from one end of a fixed piece 26 in a direction inclined with respect to the fixed piece 26. For example, the slide coupling device 13 is formed by bending a substantially rectangular metal plate member. To each of the upper and lower edge portions of the left-side plate 1Cb and the like, the fixed piece 26 of this slide coupling device 13 is fixed by using a screw 25. In this fixed state, the fitting piece 17 protrudes from the upper or lower edge of the left-side plate 1Cb or the like. In addition, when the fixed piece 26 is fastened with the screw to the inner wall 15 of the left-side plate 1Cb or the like, the fitting piece 17 takes a state where the fitting piece 17 gradually extends outward from the inner wall 15 side to an outer wall 16 side of the left-side plate 1Cb or the like with a front end of the fitting piece 17 positioned outermost. A suitable number of the above-described slide coupling devices 13 are mounted on upper and lower edge side portions according to the lengths of the upper and lower edge portions of the left-side plate 1Cb and the like. Note that it is also possible to form the slide coupling devices 13 to have long lengths, so that the fitting pieces 17 can protrude over substantially the entire lengths of the upper and lower edge portions of the right-side plate 1Ca and the like.

On the other hand, each of the above-described fitting grooves 14 is formed in an inclined and recessed manner in a bottom surface of each of both side edge portions of the top plate 1A and the like, so that the fitting groove 14 can be fitted with the fitting piece 17 inclined with respect to the left-side plate 1Cb or the like as described above. Each of the fitting grooves 14 is formed over a length extending from a front edge of the top plate 1A or the like to a surface of the vertical member 23 of the back member 1Cc.

Accordingly, the box-shaped AV rack is completed, when the left-side plate 1Cb and the like are pushed between the top plate 1A and the bottom plate 1B from the front, and rear edges of the left-side plate 1Cb and the like are moved to the surface of the back member 1Cc by sliding the fitting pieces 17 of the slide coupling devices 13 in the fitting grooves 14. In this state, upper and lower edges of the left-side plate 1Cb and the like abut on a back surface 10 of the top plate 1A and a front surface 10 of the bottom plate 1B. For this reason, each of the top plate 1A and the bottom plate 1B does not rotate around the rear edge portion in a direction in which the top plate 1A and the bottom plate 1B become close to each other, and the coupling metal pieces 2 do not deform, either. Note that, in this state, edges of the coupling metal pieces 2 are in contact with the front surface of the back member 1Cc, and hence the rear edges of the left-side plate 1Cb and the like do not move to positions beyond the front surface of the back member 1Cc.

Meanwhile, to prevent each of the top plate 1A and the bottom plate 1B from rotating in a separating direction contrary to that described above around the rear edge portion, stoppers 18 are formed in the top plate 1A and the bottom plate 1B. Each of the stoppers 18 are made of a material having a high strength such as a metal. In this embodiment, the stopper 18 is formed by embedding a base end portion of a metal plate member in the top plate 1A or the like and causing a front end portion of the metal plate member to protrude from the back surface of the top plate 1A or the front surface of the bottom plate 1B. In the top plate 1A or the like, the stopper 18 is arranged adjacent to and inside the fitting groove 14, and an outer wall surface of the stopper 18 is in contact with a surface of the above-described fixed piece 26 or the outer wall surface of the stopper 18 surfaces the surface of the fixed piece 26 with a small space provided therebetween. In addition, to efficiently restrict the rotation of the top plate 1A or the like around the rear edge portion as described above, the stopper 18 is arranged only in a front edge portion of the top plate 1A or the like.

For example, when the front edge portion of the top plate 1A rotates around the rear edge portion in the direction separating from the bottom plate 1B, the fitting groove 14 inclined from the inside to the outside of the top plate 1A or the like would release the fitting piece 17 in such a manner as to push out the fitting piece 17 to the inside. However, the stopper 18 positioned inside the fitting piece 17 as described above restricts the movement of the fitting piece 17, and prohibits the release. Accordingly, the rotation of the top plate 1A and the like around the rear edge portions in the separating direction is prohibited by the stoppers 18.

In addition to the above-described stopper 18, a spring 27 is set between an upper end 9 of the back member 1Cc and a bottom surface 10 of the top plate 1A to restrict the rotation of the top plate 1A and the like in the above-described separating direction. Specifically, the spring 27 has a lower end portion embedded in an unillustrated recessed portion formed in the upper end portion of each of the vertical member 23, and an upper end portion protruding from the upper end 9 of the vertical member 23.

Accordingly, when the side wall 10 of the top plate 1A or the like abuts on the member end 9 of the back member 1Cc, the spring 27 is compressed, so that a biasing force acts on the top plate 1A or the like in the above-described approaching direction.

The above-described AV rack can take a pre-assembled state where the AV rack as a whole is folded up into a plate-like shape as shown in FIG. 1B as follows. Specifically, after the right-side plate 1Ca and the left-side plate 1Cb are detached from the top plate 1A and the like, the top plate 1A and the bottom plate 1B are stacked on the surface of the back member 1Cc, and also the right-side plate 1Ca and the like are stacked on the back member 1Cc and the like. This compact state makes it possible to improve the transportation efficiency. After the AV rack in this state is carried into a room or the like where the AV rack is used, the AV rack can be assembled into a box-like shape as follows. Specifically, the frame component portion 11 is transformed to have a U-shaped cross section by lifting up the top plate 1A and the like from the back member 1Cc by holding the front edge portions thereof, and further the right-side plate 1Ca and the like are fitted by fitting the slide coupling devices 13 into the fitting grooves 14. When the top plate 1A and the like are lifted up as described above, each of the coupling metal pieces 2 plastically deforms around the non-layered and non-stacked portion 7 having a lower rigidity than the layered and stacked portions 6, more precisely, around the linear region 4 which is positioned at a center portion of the coupling metal piece 2 and which overlaps with the boundary to the back member 1Cc, without requiring a large force.

Figure 5A:
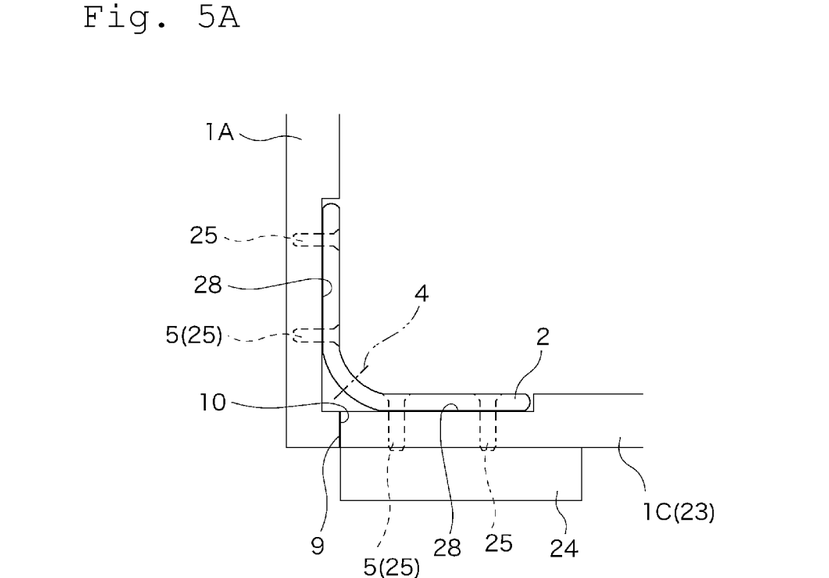
FIG. 5A is a view illustrating a first modification.
Figure 5B:
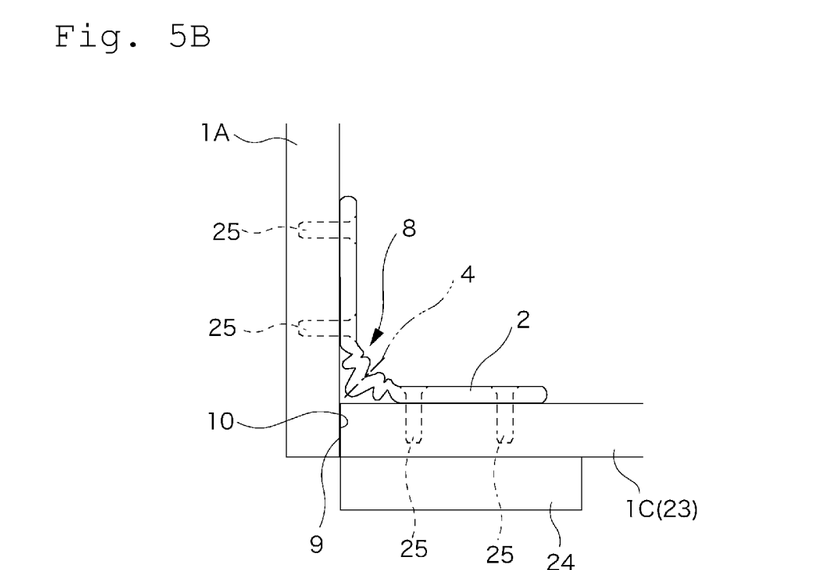
FIG. 5B is a view illustrating a second modification.

FIGS. 5A and 5B show modifications of the above-described metal piece coupling portion 3. Note that, in these modifications and another embodiment described later, constituents which are the same as those in the above-described embodiment are denoted by the same reference characters in the drawings, and descriptions thereof are omitted. Part FIG. 5A shows a first modification. In this modification, the coupling metal piece 2 as a whole forms a single plate shape, and is fixed to the back member 1Cc and to the top plate 1A or the like with coupling portions 5 at positions corresponding to both the edges of the above-described non-layered and non-stacked portions 7.

The distance between the screws 25 in the center portion of the coupling metal piece 2 is made narrower in the above-described coupling portions 5 than in the above-described embodiment. When the top plate 1A or the like is lifted from the back member 1Cc, the stress is concentrated on a narrow region in the center portion, because the rigidity near the coupling portions 5, i.e., the screws 25 is high. This makes it possible to deform the coupling metal piece 2 by bending the coupling metal piece 2 locally around the linear region 4 at the center of the region.

In addition, in this modification, recessed portions 28 for embedding the coupling metal pieces 2 are formed in rear edge portions of the top plate 1A and the bottom plate 1B and in upper and lower edge portions of the back member 1Cc. This makes it possible to stack the top plate 1A and the like on the back member 1Cc in closer contact with each other, and to further reduce the thickness in the folded state.

On the other hand, in the modification of FIG. 5B, a bellows-shaped zigzag portion 8 is formed at a position corresponding to the above-described non-layered and non-stacked portion 7 of the coupling metal piece 2, and the deformability is locally improved.

Figure 6A:
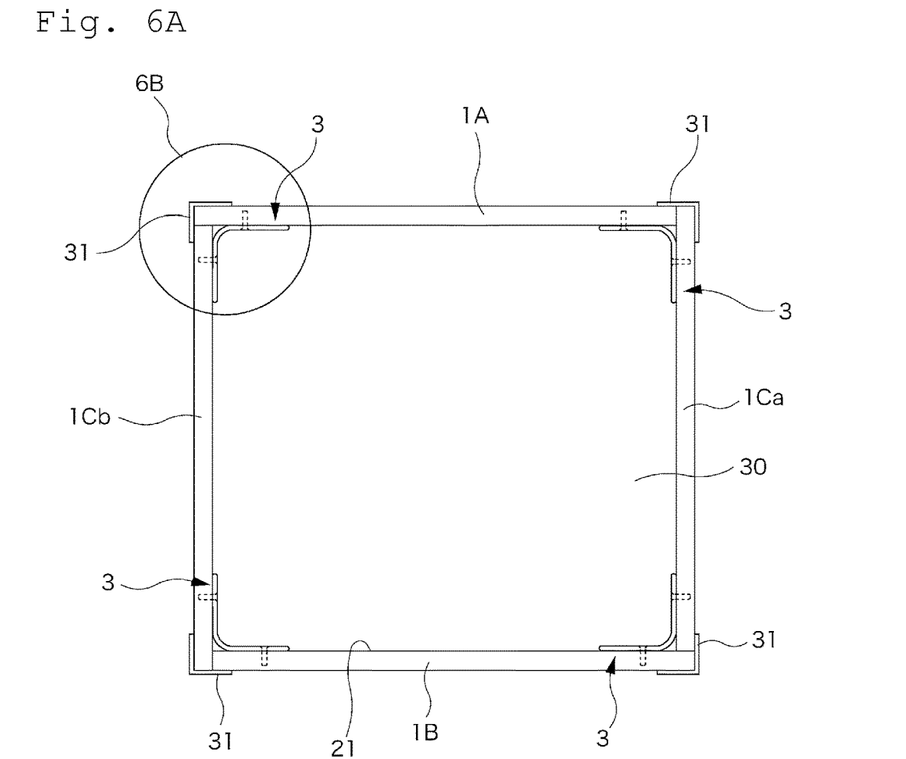
FIG. 6A is a front view illustrating an assembled state.

FIGS. 6A to 7B show another embodiment. This embodiment is configured as a housing box having a box-like shape and being open to the front. As shown in FIG. 6A, the top plate 1A and the bottom plate 1B are coupled to the left-side and right-side plates 1Ca and 1Cb by the metal piece coupling portions 3 at peripheral edge portions where they are adjacent to each other, and form a rectangular frame shape as a whole. In addition, the top plate 1A, the bottom plate 1B, and the left-side and right-side plates 1Ca and 1Cb constitute the frame shape with one end 9 of opposite peripheral edges abutting on an inner wall surface 10 of an adjacent plate member and with an inner wall surface 10 of the other edge portion being in contact with an end 9 of the other one of the adjacent plate members, for example, such that a right-side end 9 of the top plate 1A abuts on an inner wall surface 10 of an upper edge portion of the right-side plate 1Ca, and a lower end 9 of the right-side plate 1Ca abuts on an inner wall surface 10 of a right-side edge portion of the bottom plate 1B.

Figure 6B:
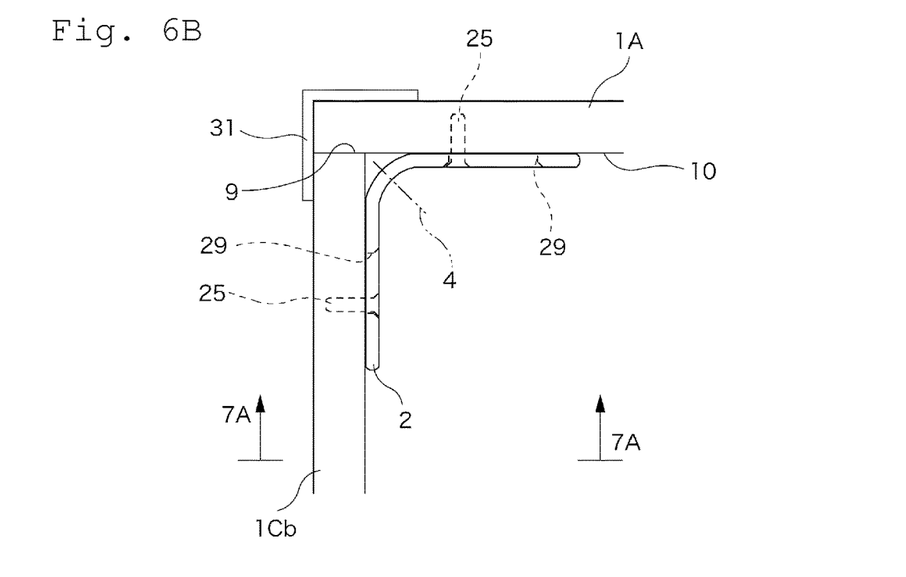
FIG 6B is an enlarged view of a portion 6B of FIG. 6A.
Figure 7A:
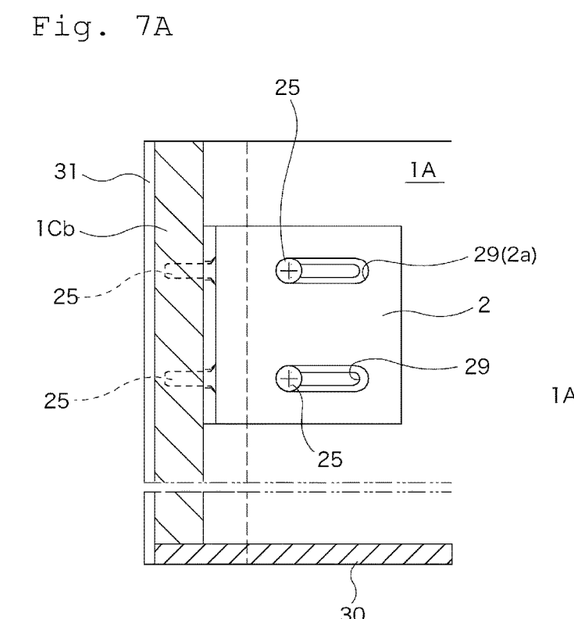
FIG. 7A is a cross-sectional view taken along the line 7A-7A of FIG. 6A.
Figure 7B:
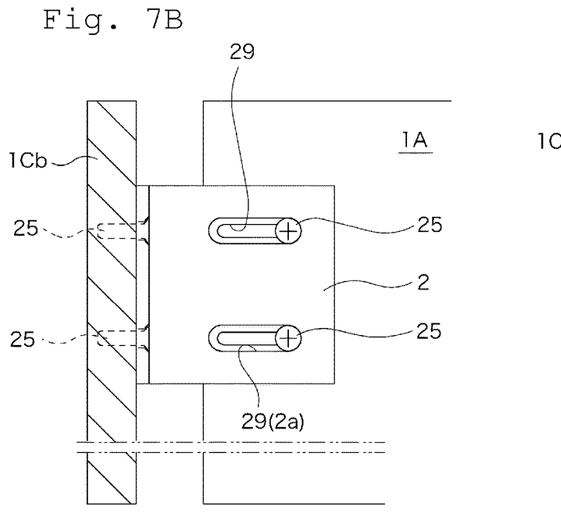
FIG. 7B is a view illustrating a state of the coupling structure at a sliding operation and corresponding to FIG. 7A.

In addition, as shown in FIG. 6B and FIGS. 7A and 7B, slots 29 are formed in each of the coupling metal pieces 2 in regions corresponding to the above-described layered and stacked portions 6. When the screws 25 are moved within the slots 29, the coupling metal piece 2 slides on the surface of the plate member to be fastened by the screws.

Moreover, one of the openings of the frame shape formed by the top plate 1A and the like as described above is covered by a back plate 30 as shown FIGS. 7A and 7B. Peripheral edges of this back plate 30 are fixed to rear edges of the top plate 1A and the like by, for example, an adhesive agent. In addition, a coupling device 31 made of an L-shaped metal plate or the like is fixed to each corner portion of the above-described frame shape by an adhesive agent. Here, an inner wall surface of the coupling device 31 straddles peripheral edge portions of plate members adjacent to each other.

Figure 7C:
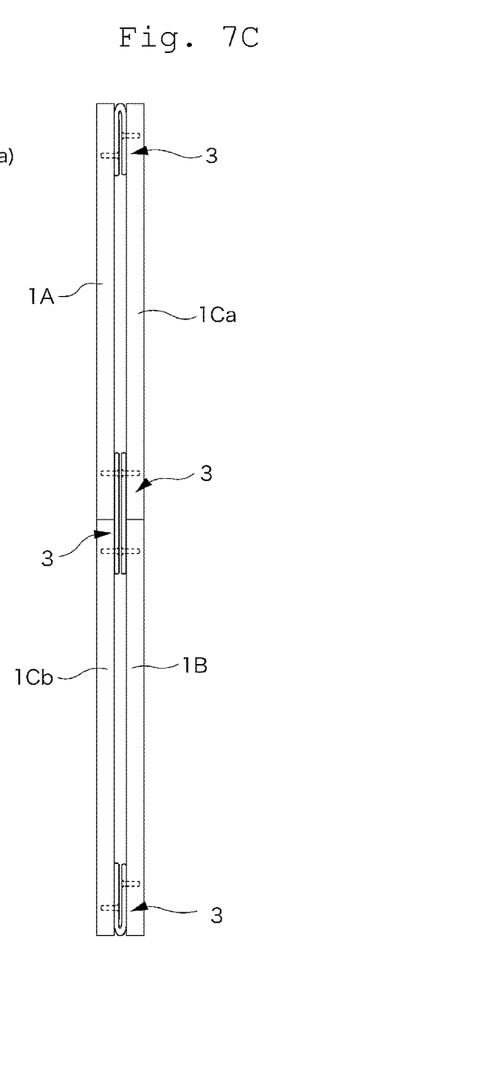
FIG. 7C is a front view illustrating a pre-assembled state.

The above-described housing box takes a pre-assembled state where the top plate 1A and the like as a whole form a plate-like shape by bending or stretching the coupling metal pieces 2 as shown in FIG. 7C. When the housing box in this state as a whole is transformed by sliding, so that the top plate 1A can be positioned on an upper surface of the bottom plate 1B, the shape is converted to a tubular shape, as shown in FIG. 6A. After that, the back plate 30 and the coupling device 31 are attached to achieve an assembled state in the box-like shape.

LIST OF REFERENCE CHARACTERS 1 wall surface component member
2 coupling metal piece
3 metal piece coupling portion
4 plastic deformation line
5 coupling portion
6 layered and stacked portion
7 non-layered and non-stacked portion
8 bellows-shaped zigzag portion
9 member end
10 side wall
11 frame component portion
12 coupling wall surface component member
13 slide coupling device
14 fitting groove
15 inner wall
16 outer wall
17 fitting piece
18 stopper

The invention claimed is:

1. Ready-to-assemble furniture, in which at least a portion of a group of wall surface component members, the portion being a number of the group, that are adjacent to one another are coupled to one another with prescribed included angles, the ready-to-assemble furniture comprising:
at least one metal piece coupling portion with which a pair of the wall surface component members are coupled to each other by a coupling metal piece having toughness, and which enables a transition from a pre-assembled state where one of the wall surface component members takes a stacked or deployed position with respect to the other to an assembled state where the wall surface component members are set with a prescribed included angle by a lifting operation by an assembler, wherein
the coupling metal piece has an elasticity that is configured to be plastically deformed by a bending stress generated in the coupling metal piece with the lifting operation and maintains a relative position of the wall surface component members absent additional support structure to maintain the wall surface component members at the prescribed included angles, an orthogonal state between a top wall surface component member and a side wall surface component member maintained when the ready-to-assemble furniture is in an upright state;
layered and stacked portions are formed in the coupling metal piece except for a center portion by folding back opposite side edges of the coupling metal piece; and
a non-layered and non-stacked portion forms a plastic deformation line.

2. The ready-to-assemble furniture according to claim 1, wherein
in the coupling metal piece, the plastic deformation line is set by providing rigidity at either side of a narrow-width region that includes the plastic deformation line via coupling portions placed at either side of the narrow-width region to couple the coupling metal piece with at least one wall surface component member.

3. The ready-to-assemble furniture according to claim 2, wherein
the plastic deformation line is formed between coupling portions, in which the coupling metal piece is coupled to the wall surface component members, by arranging the coupling portions to result in an increase in the rigidity of the coupling portions.

4. The ready-to-assemble furniture according to claim 2, wherein
the plastic deformation line is formed by providing a bellows-shaped zigzag portion in the center portion of the coupling metal piece.

5. The ready-to-assemble furniture according to claim 1, wherein
in the coupling metal piece in the assembled state, a member end of the one of the wall surface component members abuts on the side wall surface component member to determine the included angle between the wall surface component members.

6. The ready-to-assemble furniture according to claim 1, comprising:
a frame component portion formed by coupling the coupling metal piece to at least two wall surface component members to form a part of a frame; and an additional coupling wall surface component member configured to couple free-edge portions of the frame component portion to complete the frame.

7. The ready-to-assemble furniture according to claim 6, wherein
the coupling wall surface component member and each of the free-edge portions of the frame component portion are coupled to each other by fitting a slide coupling device having a dogleg-shaped cross section and being fixed to one of the coupling wall surface component member and the free-edge portion of the frame component portion into a fitting groove formed in the other of the coupling wall surface component member and the free-edge portion of the frame component portion.

8. The ready-to-assemble furniture according to claim 7, wherein
the slide coupling device is fixed to the coupling wall surface component member, with a fitting piece protruding from an inner wall side to an outer wall side of the coupling wall surface component member in an inclined manner from a member end of the coupling wall surface component member abutting on the frame component portion, and
a stopper for restricting movement of the coupling wall surface component member to the inner wall side is formed on the free-edge portion of the frame component portion.

9. The ready-to-assemble furniture according to claim 1, wherein
the coupling metal piece is one of a plurality of coupling metal pieces,
a frame component portion having a rectangular frame shape is provided in which the wall surface component members are coupled together by the coupling metal pieces, and whose assembled state is maintained with member ends of a pair of the wall surface component members facing each other abutting end-portion side walls of adjacent wall surface component members,
the coupling metal pieces are movably coupled to abutting ones of the wall surface component members in a longitudinal direction, and
the frame component portion is transformable to the pre-assembled state by aborting an abutting state by sliding slidable ones of the wall surface component members in the assembled state away from their positions in the abutting state, and then collapsing the rectangular frame shape.

10. Ready-to-assemble furniture, in which at least a portion of a group of wall surface component members, the portion being a number of the group, that are adjacent to one another are coupled to one another with prescribed included angles, the ready-to-assemble furniture comprising:
at least one metal piece coupling portion with which a pair of the wall surface component members are coupled to each other by a coupling metal piece having toughness, one of the wall surface component members taking a stacked or deployed position with respect to the other in a pre-assembled folded state, wherein
the coupling metal piece is configured to be fixed to the wall surface component members in the pre-assembled folded state;
the coupling metal piece has an elasticity that is configured to be plastically deformed by a bending stress generated in the coupling metal piece with a lifting operation and maintains a relative position of the wall surface component members absent additional support structure to maintain the wall surface component members at the prescribed included angles, an orthogonal state between a top wall surface component member and a side wall surface component member maintained when the ready-to-assemble furniture is in an upright state;
layered and stacked portions are formed in the coupling metal piece except for a center portion by folding back opposite side edges of the coupling metal piece;
a non-layered and non-stacked portion forms a plastic deformation line; and
the coupling metal piece lacks a mechanical bearing.

* * * * *